UNITED STATES PATENT OFFICE.

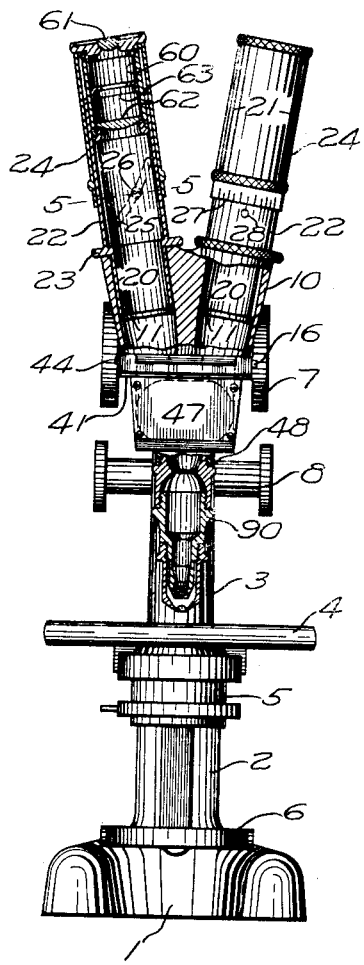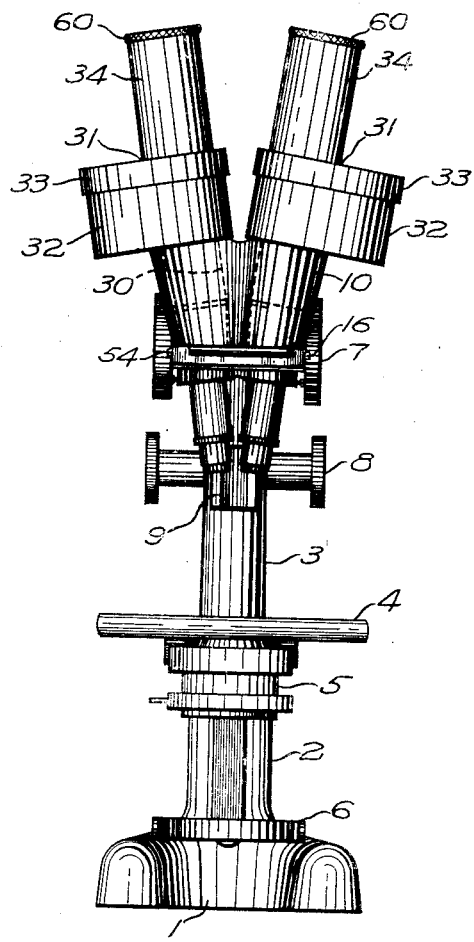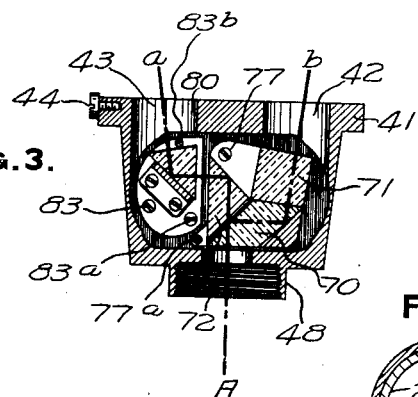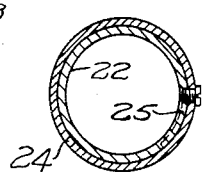

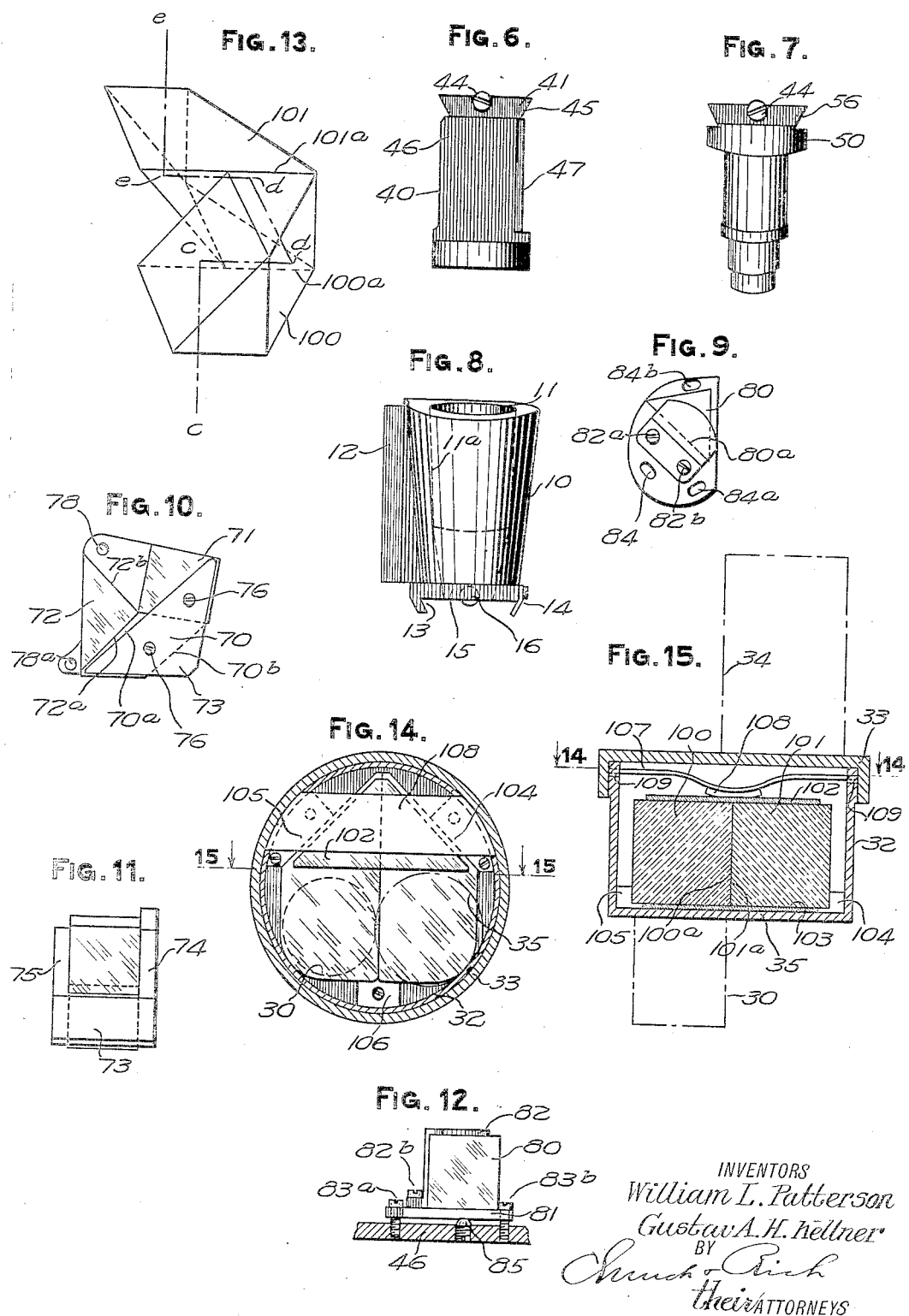

WILLIAM L. PATTERSON AND GUSTAV A. H. KELLNER, OF ROCHESTER, NEW YORK, ASSIGNORS TO BAUSCH & LOMB OPTICAL COMPANY, OF ROCHESTER, NEW YORK, A CORPORATION OF NEW YORK.

BINOCULAR MICROSCOPE.

1,225,167.  Specification of Letters Patent.  Patented May 8, 1917.

Application filed December 27, 1915.  Serial No. 68,614.

*To all whom it may concern:*

Be it known that we, WILLIAM L. PATTERSON and GUSTAV A. H. KELLNER, citizens of the United States, and residents of Rochester, in the county of Monroe, State of New York, have invented certain new and useful Improvements in Binocular Microscopes; and we do declare the following to be a full, clear, and exact description of same, reference being had to the accompanying drawings, forming a part of this specification, and to the characters of reference marked thereon.

Our invention relates to microscopes and more particularly relates to binocular microscopes. Objects of the present invention are: to embody in a single instrument advantages of binocular and monocular microscopes; to provide an instrument that is readily convertible from a twin objective binocular microscope to a single objective binocular microscope and vice versa; to provide an instrument that is particularly comfortable for the observer to use; and to provide a new and improved construction whereby the above objects may be accomplished.

To these and other ends our invention consists in certain improvements and combinations of elements all as hereinafter set forth and particularly pointed out in the appended claims.

In the drawings, Figure 1 is a front elevation of the microscope of the Greenough type embodying features of our invention.

Fig. 2 is a front elevation of the same microscope converted into a binocular microscope of the mono-objective type, portions of the instrument being shown in section.

Fig. 3 is a vertical sectional elevation of the objective prism box on an enlarged scale viewed from the front.

Fig. 4 is a vertical section, on an enlarged scale, of our improved form of twin objective mounting of the Greenough type.

Fig. 5 is a section on an enlarged scale, taken on the line 5—5 of Fig. 2.

Fig. 6 is a side elevation of the objective prism box.

Fig. 7 is a side elevation of the twin objective mount.

Fig. 8 is a side elevation of the twin body tube member.

Fig. 9 is a detail view on an enlarged scale of one of the prisms of the objective prism system and its mounting.

Fig. 10 is a detail view of the remainder of the objective prism system and its mounting.

Fig. 11 is an elevation of the prism system and mounting shown in Fig. 10, looking from the right of said figure.

Fig. 12 is a detail view showing the manner in which the prism and mounting shown in Fig. 9 is adjustably mounted, said prism and mounting being shown in elevation looking from the right of Fig. 9.

Fig. 13 is a perspective view of the ocular prism system showing the course of light therethrough.

Fig. 14 is a section on the line 14—14 of Fig. 15 looking in the direction of the arrows.

Fig. 15 is a section on line 15—15 of Fig. 14 looking in the direction of the arrows.

Like characters of reference throughout the several figures of the drawings indicate like parts.

The apparatus shown was designed particularly with a view that a low power stereoscopic binocular instrument may be transformed almost instantly into a high power non-stereoscopic instrument without necessitating any change further than removing a pair of twin objectives carried on a common mounting and substituting therefor a unit embodying an objective prism system and a coöperating single objective; an operation of not more than a few seconds.

Referring now more particularly to the drawings, the numeral 1 indicates a microscope base, carrying the pillar 2, surmounted by the arm 3 which may be hinged to the pillar or rigid therewith. Projecting from the lower end of the arm is the microscope stage 4 and beneath the latter is the condenser mounting 5 and the mirror 6. The coarse rack and pinion adjustment for the lens tube is indicated by 7 and the fine adjustment mechanism by 8. The body tube member and associated parts are mounted upon a slide way 9.

Numeral 10 denotes the twin body tube member having converging bores 11 therethrough, the upper portion 11ª, Fig. 8, of which is adapted to accommodate tubular projections 20—20 or 30—30, of the different oculars as shown in Figs. 1, 2 and 15. Numeral 12 indicates the dove-tail portion whereby member 10 is adapted to be secured to the body tube carriage of the microscope stand. Numeral 13 indicates a dove-tail slide-way having a spring gib 14 forming one of the walls thereof which dove-tail slide-way is adapted to receive coöperating portions of the objective prism carrier or casing and twin objective carrier 50 as will be explained later. Numeral 21 denotes as a unit a nonerecting ocular which although suited for use either in connection with a single objective or with a twin objective, is particularly suited for high power work with a single objective. This ocular comprises the member 22 having flanges 23 and the tubular projections 20 integral therewith. Coöperating with the upper portion of member 22, is a tubular member 24 which carries an eyepiece comprising eye lens 61, field lens 62, diaphragm 63 and a suitable mount 60 therefor. The member 22 is provided with a suitable groove 25 with which coöperates screw 26 threaded into member 24 as shown in Figs. 2 and 5. Groove 25 is only cut part way through member 22 whereby member 22 is still retained light tight. A scale 27 provided on member 24, and coöperating with the index 28, facilitates adjustment of the pupilary distance between the eye lenses 61 which is effected by moving members 24 outwardly or inwardly respectively, when the interpupilary distance is to be increased or diminished. The angle of convergence of the axis of bores 11ª is such that the lines of sight from eye lenses 61 converge at an angle preferably of 16° which we have found to be a very desirable angle of convergence.

Prism casing or box 40 has on its upper end a dove tail portion 41 designed to enter and be held by dove-tail 13 in body member 10 and is adapted to be brought into position as shown in Fig. 2 with light passages 42 and 43 in line with bores 11—11 of member 10. To facilitate the locating of member 40 with the optical axes a—b thereof coincident with the axes of the ocular system or at least those axes that emerge from the lower end of the ocular system and which usually are concentric with tubular projections 20 and 30, a stop screw 44 is provided which is adapted to bear against lateral surface 15 of member 10 and in order to insure against member 40 being placed in dove-tail 13 from the wrong end a screw 16 is provided on that end of the dove-tail 13 from which it is desired to prevent the entrance of the member 40, thereby always insuring the member 40 being placed in its holder in the same position, and thus avoid decentering the objective and its prism system from this cause. To further insure centering of the member 40 a spring gib 14 is provided to bear against the side 45 of the dove-tail portion of member 40 whereby the remaining portion of the dove-tail is clamped against corresponding portions of the dove-tail 13. This spring gib 14 also permits slight variations in the size of the coöperating dove-tail member which are inserted in dove-tail 13, which is a highly desirable feature since interchangeability of members such as member 40, and member 50 may be effected without requiring any allowance for clearance or looseness.

Within the prism box 40 is mounted a prism system comprising prisms 70 and 71 which are cemented together at their contacting surfaces and thus made practically integral; prism 72 which contacts with the prism 70 is provided at its contacting surface namely, 72ª with a half shade silver film which divides the light rays received from the direction of objective axis A and directs one half of these light rays along ocular axis a and the other half along ocular axis b. This silver film is in intimate contact with surface 70ª (which is not silvered) of prism 70. Reflecting surface 72ᵇ of prism 72, and 70ᵇ of prism 70, are preferably silvered. The prism system just described which we will designate and may hereinafter refer to as a "primary objective prism system" is mounted in a mounting 73 which comprises lower plate 74 to which the prism system 70, 71 and 72 are secured by screws 76 which pass through the upper plate of mounting 73. The lower plate 74, the upper plate 75 and the intermediate portion of 73 of the mounting just described are preferably integral. Thus the primary prism system forms with mounting 73, a unit that may be independently located and adjusted within prism box 40 so that the said prism system is simultaneously alined with objective axis A, the axis b of the ocular system coöperating therewith, see Fig. 3. The primary objective prism system may be secured in place by means of screws 77—77ª passing through apertures 78—78ª respectively and threaded into the rear wall 46 of prism box 40. Coöperating with the primary prism system is a supplementary prism 80 the surface 80ª of which is preferably silvered. This prism is mounted on a plate 81 to which it is secured by means of clamp 82 through the agency of screws 82ª—82ᵇ. The unit consisting of prism 80 and its mounting is secured to the wall 46 of prism box in the following manner: A ball pointed screw 85 is threaded into the wall 46 as is shown in Fig. 12, and upon this ball point is placed the base of the mount 81 of prism 80 in which position it is adjustably secured by screws 83—83ª—83ᵇ passing through slots 84—84ª—84ᵇ respectively, thereby effecting a universal movement for the supplementary prism unit whereon the said unit may be rotated or shifted in any direction in order to simultaneously aline said supplementary prism with the light rays emerging from prism 72 and the axis $b$ which constitutes a continuation of the axis of the lower end of the coöperating ocular system, see Fig. 3. If desired for screw 85 may be substituted a ball "let into" a suitable depression in wall 46. A cover 47 is provided for prism 40 which is secured to the prism box by suitable screws as shown in Fig. 1. At the lower end of prism box 40 is formed an internally threaded tubular socket 48, the thread therein being preferably the usual standard "Society thread." Into socket 48 is screwed a suitable single objective 90 which may be of any well known form. Obviously if desired a revolving nose piece of any well known form and provided with a plurality of objectives, may be interposed between the objective 90 and socket 48, suitable provision being made for the increase in the "mechanical tube length" of the instrument whereby a plurality of different objectives may be used, as in the case of well known forms of monocular microscopes.

Interchangeable with prism box 40 and its objective 90 is a member 50 on which are carried objective mounts 51—51 which are held and centered by three screws 53 which coöperate with flanges 54. In the lower ends of objective 51 are located objective lenses 55. The beveled portion 56 of objective carrier 50 coöperates with dove-tail slide 13 in the same manner that dove-tail 41 of prism box 40 coöperates with the prism box 40, the carrier 50, being also provided with stop screw 44 whereby it is manifest from the drawings that the objective system shown in Fig. 4 may be substituted for the prism box and objective shown in Fig. 2.

For use with the twin objective shown in Fig. 4, while the eye-pieces 21 shown in position in Fig. 2 are usually suitable, we prefer to use the form of ocular shown in Fig. 1 and indicated generally by the numeral 31. These binoculars comprise in the main the tubular extension 30 which is adapted to enter and engage the part 11ᵃ of body member 10, the prism box 32 having a cover 33 from which project extensions 34 which receive the usual eye-pieces 60. It will be noted from Figs. 14 and 15 that extensions 30—34 are eccentric and thus interpupilary distance between the eye lenses 61 of eye-pieces 60, with this form of ocular system, is effected by rotating the oculars 31 about the axes of the tubular extensions 30, whereby a considerable range of interpupilary adjustment is easily attained. Within prism box 32 is mounted an ocular prism system comprising prisms 100—101. These prisms are cemented together at their contacting faces 100ᵃ—101ᵃ and are secured by means of glass plates 102—103 cemented to the upper and lower surfaces of these contacting prisms and spanning the joint between prisms 100—101. Prism 100—101 thus forms substantially a unit which sits on the lower surface 35 of prism box 32 between cleats 104, 105 and 106. A bowed flat spring 107 provided with a cushion 108 bears on the upper glass plate 102 of the ocular system, thereby yieldingly and securely holding the prism in place in the prism box 32. Spring 107 sits in slots 109 in the wall of the prism box 32 and is placed by inserting one end into its respective slot, sliding the spring longitudinally, compressing the spring, entering the other end of said spring 107 into its respective slot, and positioning the spring longitudinally. After being so placed the spring is constrained against longitudinal displacement by means of the cover 33, well shown in Figs. 14 and 15.

The path of light through the prism system of this ocular is best shown in Fig. 13, the rays entering from the objective 55 along the line $c$—$c$ are then reflected along line $c$—$d$, then along line $d$—$d$, then $d$—$e$ and finally emerging along line $e$—$e$ enter eye-piece 60. This type of ocular provides an erecting system whereby the image viewed stands erect and which for many purposes where a slight loss of light due to the added number of reflections and the amount of glass to be traversed, is not a detriment.

Thus in the instrument described we have an instrument wherein a twin objective is interchangeable with a single objective and wherein an eye-piece having a prismatic erecting system is interchangeable with a simple eye-piece. Thus by means of the accessories shown in Figs. 1, 2, 3 and 4 that is, the stand and body member, the oculars shown in Fig. 1, the oculars shown in Fig. 2, the prism box shown in Fig. 3, and the objectives shown in Figs. 4 and 1 of various degrees of power, a binocular microscope is provided that is adapted to cover a considerable range from very low magnifications to very high magnifications.

Having thus described one embodiment of our invention what we desire to secure by Letters Patent of the United States, is:

1. An attachment for binocular microscopes having a pair of twin objectives mounted on a common carrier, said attachment consisting of a single objective and an objective prism system associated therewith, a carrier for said objective and prism system, the last named carrier and the optical elements carried thereby being adapted to be interchangeable with the first named carrier and the twin objectives.

2. An attachment for binocular microscopes having a pair of twin objectives mounted on a common carrier, said attachment consisting in the combination of a prism system, a carrier for said prism system interchangeable with the carrier for the twin objectives, an objective system adapted to be associated with said prism system and a mounting for the objective detachably secured to the prism carrier.

3. An attachment for microscopes embodying a pair of oculars and a pair of twin objectives removably mounted in coöperative relation to said oculars, said attachment consisting in the combination of a casing having a pair of ocular openings in its upper wall and an objective opening in its lower wall, an objective detachably mounted in registry with said objective opening, a primary prism mounted within the casing in fixed relation to the objective opening and one of the ocular openings, a supplementary prism mounted on a universally adjustable plate having a single point bearing with the casing structure and disposed within said casing intermediate the primary prism and the other ocular opening, said casing and objective being adapted to be substituted for the twin objectives in coöperative relation with the oculars.

4. An objective prism system for microscopes including an objective and a pair of oculars, said prism system comprising a primary prism having a partially reflecting surface adapted to be interposed in the axis of the objective, said surface functioning to simultaneously reflect and transmit complementary portions of light received from the objective, a totally reflecting surface arranged in the path of the light reflected by the partially reflecting surface and functioning when in the light path of one coöperating ocular to reflect light received from said partially reflecting surface into said ocular and a totally reflecting surface disposed in the path of light transmitted by said partially reflecting surface, a supplementary prism coöperating with said primary prism, said supplementary prism being adapted to receive the light reflected by the last named totally reflecting surface and direct said light into the remaining ocular, and means for supporting the objective, oculars and the prism system in coöperative relation.

WILLIAM L. PATTERSON.
GUSTAV A. H. KELLNER.

Witnesses:
WILLIAM G. WOODWORTH,
DANIEL M. SMITH.